(12) United States Patent
Koike et al.

(10) Patent No.: US 6,948,598 B2
(45) Date of Patent: Sep. 27, 2005

(54) BRAKE DRUM FOR WET-TYPE BAND BRAKE DRUM AND METHOD FOR MANUFACTURING THE SAME

(75) Inventors: Yasuhito Koike, Iwata (JP); Nobuhiro Nakazawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/615,825

(22) Filed: Jul. 10, 2003

(65) Prior Publication Data

US 2004/0026189 A1 Feb. 12, 2004

(30) Foreign Application Priority Data

| Jul. 11, 2002 | (JP) | ......................................... 2002-237209 |
| Jan. 8, 2003 | (JP) | ......................................... 2003-002447 |

(51) Int. Cl.[7] ............................................. F16D 65/10
(52) U.S. Cl. .............................. 188/218 R; 188/264 R; 188/74
(58) Field of Search .............................. 188/74, 218 R, 188/77 R, 264 E, 77 W, 18 R, 264 R, 250 A, 17

(56) References Cited

U.S. PATENT DOCUMENTS

| 1,553,670 | A | * | 9/1925 | Cautley | .................. 188/218 R |
| 1,818,100 | A | * | 8/1931 | Shields | .................... 188/218 R |
| 2,164,300 | A | * | 6/1939 | Smith, Jr. | .................. 188/77 R |
| 2,476,151 | A | * | 7/1949 | Le Jeune | ................. 188/218 R |
| 2,516,544 | A | * | 7/1950 | Breeze | .................... 188/264 E |
| 3,889,786 | A | * | 6/1975 | Schrader et al. | ........ 188/218 R |
| 6,253,883 | B1 | | 7/2001 | Wakisaka et al. | |

FOREIGN PATENT DOCUMENTS

| JP | 08-177903 | 7/1996 |
| JP | 11-051097 | 2/1999 |
| JP | 2000-238647 | 9/2000 |

* cited by examiner

Primary Examiner—Melanie Torres
(74) Attorney, Agent, or Firm—Miles & Stockbridge P.C.

(57) ABSTRACT

A brake drum for a wet-type band brake has a large number of grooves substantially along the circumferential direction on a slide contact surface with the brake band. Each adjacent grooves are smoothly linked to each other through a substantially convex arcuate cross sectional-portion. A method for manufacturing the brake drum comprises the steps of forming the grooves by cutting work, and forming a border portion between each adjacent grooves in a substantially convex arcuate cross section by plastic working using a forming roller.

6 Claims, 5 Drawing Sheets

BRAKE DRUM FOR WET-TYPE BAND BRAKE DRUM AND METHOD FOR MANUFACTURING THE SAME

This application claims the benefit of Japanese Patent applications No. 2002-237209 and No. 2003-002447 which are hereby incorporated by reference.

BACKGROUND OF THE INVENTION

1. Field of the Invention

The present invention relates to a brake drum for a wet-type band brake which is used in an automatic transmission, and a method for manufacturing the same.

2. Related Background Art

An automatic transmission for a vehicle often employs a wet-type band brake in order to control gear shift elements. A wet-type band brake usually includes a brake band which is made of a single steel plate annularly formed with a frictional member bonded onto the inner peripheral surface thereof. The diameter of this brake band is contracted by an actuator so as to fasten a brake drum disposed inside.

The brake drum for a wet-type band brake comprises an outer cylinder with a slide contact surface which is in a slide contact with the frictional member of the brake band and an inner cylinder serving as a bearing portion. The wet-type band brake is generally used for gear shift control and is usually required to have a sufficient braking performance. For this reason, in order to enhance the braking power at an initial stage of the frictional engagement, such a brake band is conventionally present which is provided with small grooves (annular grooves or helical grooves) substantially along the circumferential direction of the slide contact surface of the brake drum so as to increase a coefficient of friction thereof (see, e.g., Japanese Patent Application Laid-Open No. 8-177903 (official gazette, p. 4, FIG. 2), and Japanese Patent Application Laid-Open No. 11-51097 (official gazette, p. 2, FIG. 1)).

In a wet-type band brake of this type is, as shown in FIG. 11, for example, grooves 5 are formed at a comparatively large pitch on a slide contact surface 2 of a brake drum by cutting work. For this reason, a land 7 between each adjacent grooves 5 and 5 was not mechined and has a cross section in a linear form. Then, an edge 9 is formed in a border between the groove 5 and the land 7.

However, if the axial dimension of the land 7 is large, an oil film is interposed between the land 7 and the brake band so that a coefficient of friction at the initial stage of the frictional engagement can not be increased to a predetermined value. Particularly, since the viscosity of the transmission oil is increased at a cooling time, or the like, the oil film is hardly broken when the brake band comes into slide contact, thereby lowering the coefficient of friction. As a result, there arises a problem that the gear shift control in the automatic transmission is difficult to be conducted ideally. Note that the edge 9 which is formed in the border between the groove 5 and the land 7 may damage a little the frictional member of the brake band which is formed of a comparatively soft material at the time of frictional engagement.

In order to prevent the coefficient of friction from lowering at the initial stage of frictional engagement, it is required to reduce the axial dimension of the land 7 in order to reduce the oil film which is interposed between the land 7 and the brake band. Thus, it is examined to reduce the pitch between the grooves 5 and 5.

However, when the pitch between the groves 5 and 5 is reduced to be smaller than the width of the tip end portion of a machining tool (for example, a cutting tool) to eliminate the land, as shown in FIG. 12, the edge 9 formed between the grooves 5 and 5 becomes very sharp, thereby disadvantageously damaging the frictional member of the brake band to the extent which can not bear comparison with that with the land 7 shown in FIG. 11. The present inventors, et al., have examined to remove the edge 9 by grinding. However, this method would result in an increased number of machining or processing steps and a higher machining or processing cost, so as to deteriorate the mass productivity. As a result, it is difficult to employ this method practically.

SUMMARY OF THE INVENTION

The present invention has been contrived taking the above-described circumstances into consideration, and an object of the present invention is to provide a brake drum in which an oil film is difficult to be interposed on a slide contact surface of the brake drum with a brake band and a frictional member of the brake band is not damaged, as well as a method for manufacturing such a brake drum.

In order to solve the above problems, according to the present invention, there is provided a brake drum for a wet-type band brake having a large number of grooves substantially along the circumferential direction on a slide contact surface with the brake band, wherein each adjacent grooves are smoothly linked or connected to each other through a substantially convex arcuate cross sectional-portion.

According to a preferable feature of the present invention, a brake drum for a wet-type band brake having a large number of grooves substantially along the circumferential direction on a slide contact surface with the brake band, may be formed with a land between each adjacent grooves and the land and the grooves may be smoothly linked to each other through a substantially convex arcuate cross sectional-portion.

In a rotatory drum for a wet-type brake band of the present invention, the grooves may be formed by cutting work while the substantially convex arcuate cross sectional-portion may be formed by rolling process.

In a brake drum for a wet-type band brake of the present invention, the grooves and the substantially convex arcuate cross sectional-portion are both formed by rolling process.

In a brake drum for a wet-type band brake of the present invention, the grooves may be formed at a pitch of 0.05 mm to 0.3 mm in a dimensional range of 0.5 $\mu$m to 50 $\mu$m in depth and of 0.05 mm to 0.3 mm in width.

According to the present invention, there is provided a method for manufacturing a brake drum for a wet-type band brake having a large number of grooves substantially along the circumferential direction on a slide contact surface of the drum with the brake band, comprising the steps of: forming the grooves by cutting work; and forming a border portion between each adjacent grooves in a substantially convex arcuate cross section by plastic working using a forming roller.

A method of the present invention for manufacturing a brake drum for a wet-type band brake having a large number of grooves substantially along the circumferential direction on a slide contact surface with the brake band, may comprise the steps of: forming the grooves by cutting work; and forming a border portion between a land existing between each adjacent grooves and the grooves in a substantially convex arcuate cross section by plastic working using a forming roller.

A method of the present invention for manufacturing a brake drum for a wet-type band brake having a large number of grooves substantially along the circumferential direction on a slide contact surface with the brake band, may comprise the steps of: forming the grooves and, at the same time, forming a border portion between each adjacent grooves in a substantially convex arcuate cross section by plastic working using a forming roller.

A method of the present invention for manufacturing a brake drum for a wet-type band brake having a large number of grooves substantially along the circumferential direction on a slide contact surface with the brake band, may comprise the steps of: forming the grooves and, at the same time, forming a border portion between a land existing between each adjacent grooves and the grooves in substantially convex arcuate cross sectional-portion by plastic working using a forming roller.

In a method of the present invention for manufacturing a brake drum for a wet-type band brake, the grooves may be formed at a pitch of 0.05 mm to 0.3 mm in a dimensional range of 0.5 µm to 50 µm in depth and of 0.05 mm to 0.3 mm in width.

DESCRIPTION OF THE PREFERRED EMBODIMENTS

Embodiments of the present invention will be described with reference to the drawings.

Figure 1:
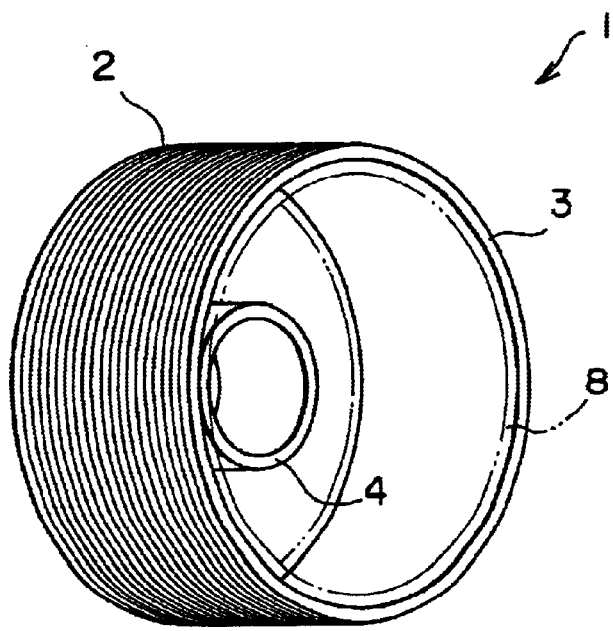
FIG. 1 is a perspective view of a brake drum according to an embodiment of the present invention.

FIG. 1 is a perspective view for showing a brake drum of an embodiment of the present invention. The brake drum 1 of the present embodiment comprises an outer cylinder 3 with the outer periphery formed as a slide contact surface 2 and an inner cylinder 4 which is provided with a bearing surface. Note that a spline 8 is provided on the inner periphery of the outer cylinder 3. However, in FIG. 1, the spline 8 is indicated by a double dotted line for simplifying the drawing.

A first embodiment of the present invention will be described below.

Figure 2:
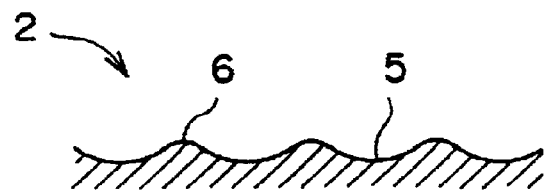
FIG. 2 is a longitudinal cross-sectional view for showing the essential portion of the brake drum according to the embodiment in an enlarged manner.

In case of the first embodiment, as shown in FIG. 2, small grooves 5 are formed on the slide contact surface 2. These grooves 5 are provided along a direction which is substantially the same as the direction of rotation of the brake drum 1. The grooves 5 and 5 are smoothly linked or connected to each other through a substantially convex arcuate cross sectional-portion 6 whose cross section is a smooth an arcuate surface having a smooth cross section or which is composed of a smooth arcuate surface and a very small flat surface (hereinafter simply called the arcuate cross-sectional portion). The grooves 5 are formed at a pitch of 0.05 mm to 0.3 mm, and in a dimensional range of 0.5 µm to 50 µm in depth and of 0.05 mm to 0.3 mm in width.

With the above configuration, a portion remaining between the grooves 5 and 5 is very scarce, so that there is no room for interposing an oil film. As a result, it is possible to prevent a coefficient of friction at an initial stage of frictional engagement from lowering. The arcuate cross-sectional portion 6 is, as described above, comprise a cross section having a smooth arcuate surface or having a smooth arcuate surface and a very small flat surface, so that a frictional member of the brake band which is in slide contact with this arcuate cross-sectional portion would not be damaged. Further, since the size of each of the grooves 5 is small, the number of the grooves 5 to be provided or the density of the grooves 5 can be increased so that the contact surface pressure when the band brake is fastened can be lowered. The grooves 5 may be a plurality of separate annular grooves or one continuous helical groove.

Figure 3:
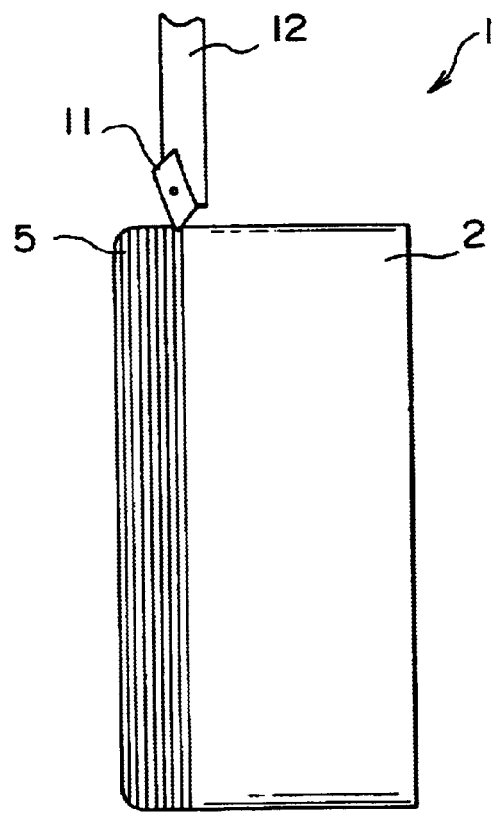
FIG. 3 is a view for showing a condition that a slide contact surface of the brake drum is subjected to a cutting work in the first embodiment.

A procedure for machining the brake drum 1 to form groove in the first embodiment will be described below with reference to FIGS. 3 to 7. In case of the present embodiment, a worker at first conducts a cutting work on an outer periphery or on slide contact surface 2 of a brake drum 1 formed by die casting. As shown in FIG. 3, the cutting work is conducted by contacting and pressing a cutting tool 11 which is fixed to a holder 12 onto the slide contact surface 2 of the brake drum 1 while rotating the brake drum 1. A manner of catching the brake drum 1 is the same as that in the case of rolling process using a forming roller which is described later.

Figure 4:
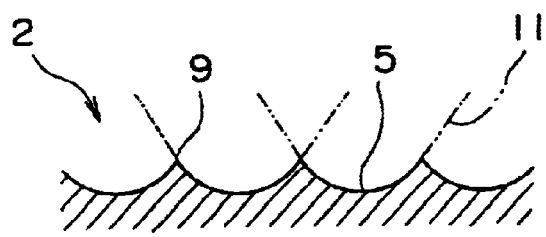
FIG. 4 is a longitudinal cross-sectional view for showing a condition of the slide contact surface which has been subjected to the cutting work in a first embodiment, in an enlarged manner.

Upon completion of the cutting work, a cross section of the groove 5 becomes as shown in FIG. 4. That is, an edge 9 is formed between the grooves 5 and 5. Note that, when a large number of annular grooves 5 are to be formed, the cutting tool 11 is taken away from the brake drum 1 whenever the work or machining of one groove is completed to be moved in the axial direction by a predetermined distance so as to contact and press the cutting tool 11 upon the brake drum 1 for the second time, repeatedly. On the other hand, when the groove 5 is to be formed in a helical shape, the cutting tool is moved in the axial direction at a predetermined moving speed while it is being urged on the brake drum 1.

Figure 5:
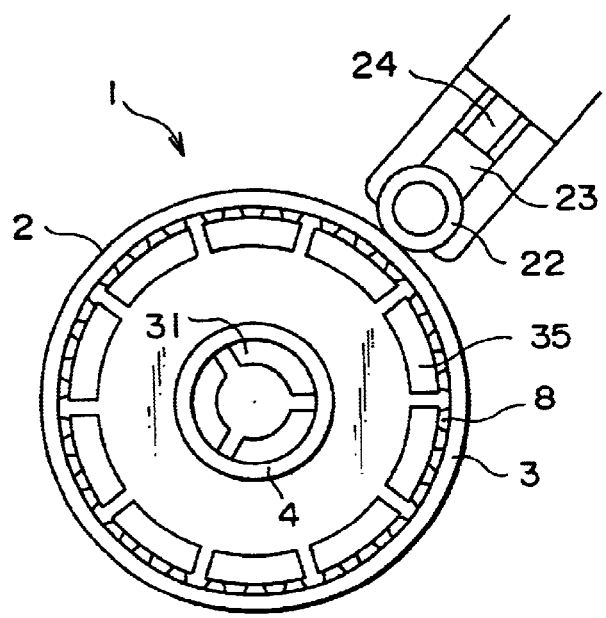
FIG. 5. is a view for showing a condition that the slide contact surface of the brake drum is subjected to a rolling process in the first embodiment.

Next, the worker conducts a rolling process by a forming roller 22 on the edge 9 between the grooves 5 and 5 which are formed by the cutting work so as to plastically deform the edge 9, thereby obtaining the arcuate cross-sectional portion 6. FIG. 5 is a side view for showing a state in which the forming roller 22 is pressed on the outer peripheral surface 2 of the brake drum 1. The inner peripheral surface of the inner cylinder 4 is caught by a first chuck 31 and the inner peripheral surface of the outer cylinder 3 is held by a second chuck 35. Since the inner peripheral surface of the inner cylinder 4 is a bearing surface which has been processed with high precision, it is possible to conduct centering at the processing or machining work with high precision by catching this surface. The inner peripheral surface of the outer cylinder 3 is held by the second chuck 35 which is composed of a large number of segments, thereby preventing elastic deformation by the pressing of the forming roller 22. Note that the holding by the second chuck 35 is conducted for convex portions of the spline 8 formed at the inner periphery of the outer cylinder 3.

The worker conducts, while rotating the brake drum 1 in this state, a rolling process by pressing the forming roller 22 onto the slide contact surface 2 of the brake drum 1, so that the forming roller may be rotated thereby. A roller holder 23 which is integrally formed with the shaft of the forming roller 22 is elastically supported by a spring 24, and the forming roller 22 is brought into pressure contact with the counterpart member by the elasticity of the spring 2. As a result, an unnecessarily large pressing load is not applied on the brake drum 1.

Figure 6:
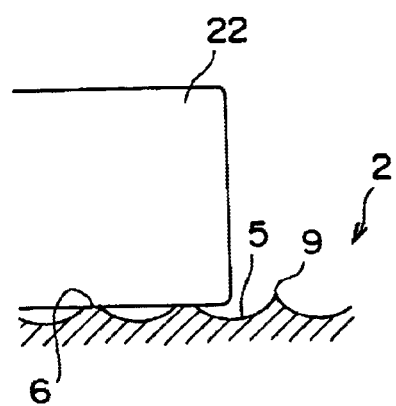
FIG. 6 is a longitudinal cross-sectional view of the essential portion for showing a condition of the rolling process in the first embodiment, in an enlarged manner.
Figure 7:
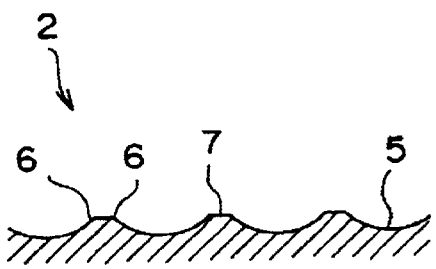
FIG. 7 is a longitudinal cross-sectional view of the essential portion for showing a slide contact surface which has been subjected to the rolling process in the first embodiment, in an enlarged manner.

FIG. 6 is a longitudinal cross-sectional view for showing a process in which the edge 9 is plastically deformed by the rolling process with the forming roller 22. The edge 9 is plastically deformed by pressing the forming roller 22 onto the slide surface 2 of the drum 1 to follow rotation thereof. The deformed edge 9 becomes the arcuate cross-sectional portion 6, as shown in FIG. 2. Or, when the pressing load of the forming roller 22 is large, a land 7 is formed between the grooves 5 and 5, as shown in FIG. 7, and the land 7 and the grooves 5 are linked or connected together smoothly by the arcuate cross-sectional portion 6.

Figure 8:
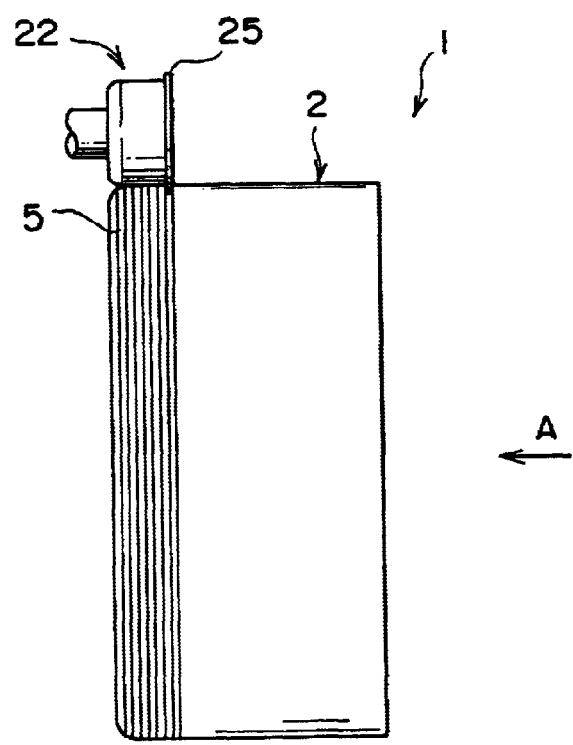
FIG. 8 is a view for showing a condition that the slide contact surface of the brake drum is subjected to the rolling process in the second embodiment.
Figure 9:
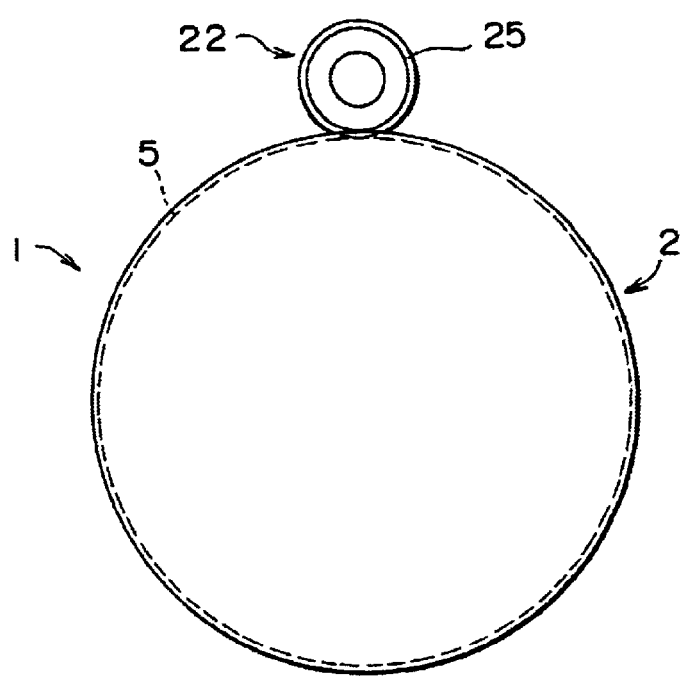
FIG. 9 is a view taken along the arrow A in FIG. 8.
Figure 10:
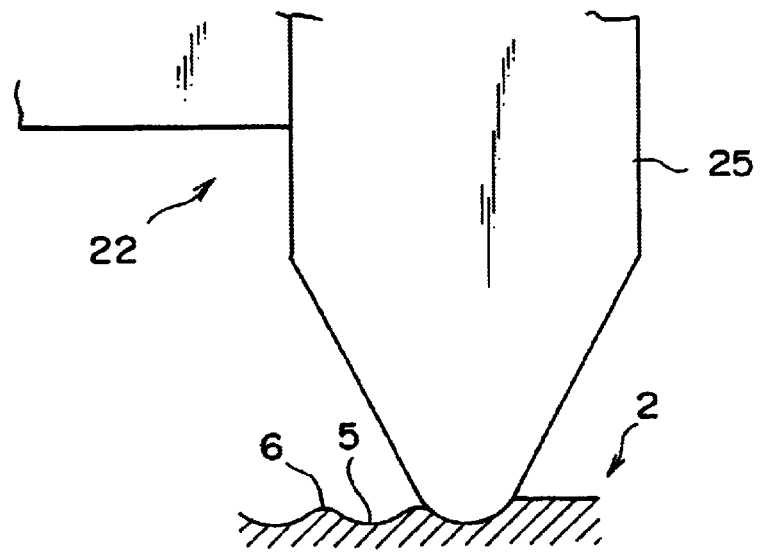
FIG. 10 is a longitudinal cross-sectional view of the essential portion for showing a state of the rolling process in the second embodiment, in an enlarged manner.
Figure 11:
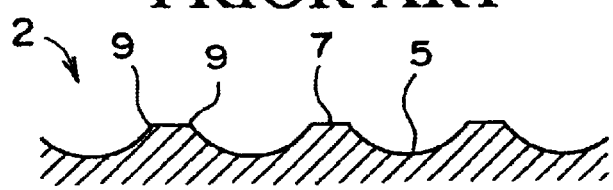
FIG. 11 is a longitudinal cross-sectional view of the essential portion for showing a slide contact surface of a conventional brake drum, in an enlarged manner.
Figure 12:
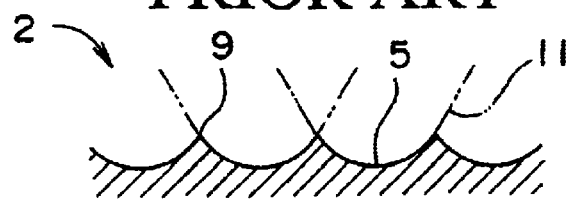
FIG. 12 is a longitudinal cross-sectional view of the essential portion for showing another slide contact surface of the conventional brake, in an enlarged manner.

A second embodiment of the present invention will be described below with reference to FIGS. 8 to 10.

In case of the second embodiment, the grooves 5 of the brake drum 1 are formed by a rolling process with the forming roller 22, and at the same time, the arcuate cross-sectional portion 6 is also formed. That is, as shown in FIG. 8 and FIG. 9 (a view taken along the arrow A in FIG. 8), the worker rotates the brake drum 1 in a state that the forming roller 22 having a processing flange 25 is being pressed upon the slide contact surface 2 of the drum 1 with a predetermined pressure, and pressing the forming roller 22 onto the slide contact surface 2 so that the forming roller 22 may rotate following rotation of the drum 1, thereby conducting the rolling process on the grooves 5 and the arcuate cross-sectional portion 6 at the same time, as shown in FIG. 10. In this manner, the cutting work described in the first embodiment is no longer required, and the number of machining steps and the time required for the process can be both reduced.

In the second embodiment, an only work to be conducted for the slide contact surface 2 of the brake drum 1 is the rolling process (plastic processing), so that cut powder is not produced in the least and, at the same time, the yield can be enhanced. In the second embodiment, it is arranged such that only the arcuate cross-sectional portion 6 is formed between the grooves 5 and 5. However, it is possible to form the land by enlarging the pitch of the grooves 5. Also, the groove 5 in the second embodiment may be formed annular, or may be helical, and a method for driving the forming roller 22 in this case is the same as that for driving the cutting tool in the first embodiment.

The present invention is effected by the above-described embodiment. Thus, it is possible to obtain a brake drum in which an oil film is difficult to be formed on the slide contact surface, a fluctuation in torque at engagement of the slide contact surface with a frictional member can be reduced, and the frictional member as a counterpart member is not damaged. It is also possible to form small-size grooves on the surface of a brake drum though under the restrictions of working or machining tools, thereby forming the brake drum of the present invention described above.

What is claimed is:

1. A brake drum in a wet type band brake having a brake band formed with a frictional member on an inner surface thereof, the brake band being applied to an outer peripheral surface of the brake drum to effect braking by frictional engagement of the frictional member with the outer peripheral surface of the brake drum;

wherein said outer peripheral surface of the brake drum is formed with a multiplicity of annular grooves extending in a rotational direction of the brake drum and a multiplicity of annular convex portions extending in a rotational direction of the brake drum and each being formed between respective neighboring grooves; and each annular convex portion has an arcuate cross section which is devoid of angled edge portions and smoothly connects the respective neighboring grooves.

2. A brake drum in a wet type band brake having a brake band formed with a frictional member on an inner surface thereof, the brake band being applied to the outer peripheral surface of the brake drum to effect braking by frictional engagement of said frictional member of the brake band with the outer peripheral surface of the brake drum;

wherein said outer peripheral surface of the brake drum is formed with a multiplicity of annular grooves extending in a rotational direction of the brake drum and a multiplicity of annular land portions extending in a rotational direction of the brake drum and each having a same diameter and being formed between respective neighboring annular grooves; and each land portion is connected to the neighboring grooves with respective arcuate cross sections each of which is devoid of angled edge portions and smoothly connects the land and the respective neighboring grooves.

3. A rotational brake drum in a wet type band brake having a brake band formed with a frictional member on an inner surface thereof, the brake band being applied to an outer peripheral surface of the brake drum to effect braking by frictional engagement of the frictional member with the outer peripheral surface of the brake drum;

wherein said outer peripheral surface of the brake drum is formed with a spiral groove extending in a rotational direction of the brake drum and a spiral crest neighboring the spiral groove and extending in a rotational direction of the brake drum, the spiral crest has a same diameter and an arcuate cross section which is devoid of angled edge portions and smoothly connects neighboring groove portions.

4. A rotational brake drum in a wet type band brake having a brake band formed with a frictional member on an inner surface thereof, the brake band being applied to an outer peripheral surface of the brake drum to effect braking by frictional engagement of the frictional member of the brake band with the outer peripheral surface of the drum;

wherein said outer peripheral surface of the brake drum is formed with a spiral groove extending in a rotational direction of the brake drum and a spiral crest neighboring the spiral groove and extending in a rotational direction of the brake drum, and the spiral crest has a land portion which has a same diameter and has ends in a widthwise direction that have respective arcuate cross sections devoid of angled edge portions and that are smoothly connected to neighboring groove portions.

5. A brake drum according to claim 1, wherein said grooves are formed at a pitch of 0.05 mm to 0.3 mm in a dimensional range of 0.05 µm to 50 µm in depth and of 0.05 mm to 0.3 mm in width.

6. A brake drum according to claim 2, wherein said grooves are formed at a pitch of 0.05 mm to 0.3 mm in a dimensional range of 0.05 µm to 50 µm in depth and of 0.05 mm to 0.3 mm in width.

* * * * *